(12) United States Patent
Godon et al.

(10) Patent No.: US 9,902,116 B2
(45) Date of Patent: Feb. 27, 2018

(54) COMPOSITE CONNECTING ROD, METHOD FOR MANUFACTURING SUCH A ROD AND AERONAUTIC CEILING OR FLOOR STRUCTURE INCORPORATING SAME

(71) Applicant: HUTCHINSON, Paris (FR)

(72) Inventors: Michaël Godon, Montargis (FR); Cristina Gonzalez-Bayon, Amilly (FR); Bertrand Florentz, Paucourt (FR); Jean-Pierre Ciolczyk, Montargis (FR)

(73) Assignee: HUTCHINSON, Paris (FR)

( * ) Notice: Subject to any disclaimer, the term of this patent is extended or adjusted under 35 U.S.C. 154(b) by 256 days.

(21) Appl. No.: 14/896,326

(22) PCT Filed: Jun. 3, 2014

(86) PCT No.: PCT/IB2014/061917
§ 371 (c)(1),
(2) Date: Dec. 4, 2015

(87) PCT Pub. No.: WO2014/195866
PCT Pub. Date: Dec. 11, 2014

(65) Prior Publication Data
US 2016/0121561 A1    May 5, 2016

(30) Foreign Application Priority Data
Jun. 5, 2013  (FR) ...................... 13 55173

(51) Int. Cl.
*B29C 70/46* (2006.01)
*F16C 7/02* (2006.01)
(Continued)

(52) U.S. Cl.
CPC ............ *B29C 70/462* (2013.01); *B29C 57/00* (2013.01); *B29C 67/0044* (2013.01);
(Continued)

(58) Field of Classification Search
CPC ... B29C 70/462; B29C 67/0044; B29C 53/60; B29C 70/06; B29C 70/50; B29C 70/32;
(Continued)

(56) References Cited

U.S. PATENT DOCUMENTS

| 5,428,896 A | 7/1995 | Auberon |
| 2010/0196637 A1 | 8/2010 | Lippert |

FOREIGN PATENT DOCUMENTS

| CA | 2146487 A1 | 10/1995 |
| DE | 44 19 691 C1 | 8/1995 |

(Continued)

OTHER PUBLICATIONS

Written Opinion of the International Searching Authority dated Jul. 18, 2014, issued in corresponding International Application No. PCT/IB2014/061917, filed Jun. 3, 2014, 6 pages.
(Continued)

*Primary Examiner* — Michael C Miggins
(74) *Attorney, Agent, or Firm* — Christensen O'Connor Johnson Kindness PLLC

(57) ABSTRACT

A connecting rod comprises a convex elongated body around a longitudinal axis of symmetry and two connecting ends for connecting to adjacent structures. The connecting rod includes two shells with two longitudinal edges that are assembled in these edges and that each have a base of at least one shell web including continuous shell fibers primarily parallel to this axis of symmetry and impregnated with a thermoplastic shell matrix. The connecting rod incorporates at least one assembly web wound around and along the shells, and assembly fibers primarily inclined relative to the axis and impregnated with a thermoplastic assembly matrix remelted in contact with the shell matrix.

16 Claims, 3 Drawing Sheets

(51) Int. Cl.
- B29C 70/32 (2006.01)
- B29C 70/52 (2006.01)
- B29C 57/00 (2006.01)
- B29C 67/00 (2017.01)
- B29C 70/06 (2006.01)
- B29C 70/50 (2006.01)
- B29D 23/00 (2006.01)
- B64C 1/18 (2006.01)
- B29L 31/06 (2006.01)
- B29K 101/12 (2006.01)
- B29C 53/60 (2006.01)
- B29K 23/00 (2006.01)
- B29K 71/00 (2006.01)
- B29K 77/00 (2006.01)
- B29K 81/00 (2006.01)
- B29K 105/08 (2006.01)
- B29K 105/10 (2006.01)
- B29K 307/04 (2006.01)
- B29L 31/30 (2006.01)

(52) U.S. Cl.
CPC ............ B29C 70/06 (2013.01); B29C 70/32 (2013.01); B29C 70/50 (2013.01); B29C 70/521 (2013.01); B29D 23/00 (2013.01); B64C 1/18 (2013.01); F16C 7/026 (2013.01); B29C 53/60 (2013.01); B29K 2023/00 (2013.01); B29K 2071/00 (2013.01); B29K 2077/00 (2013.01); B29K 2081/04 (2013.01); B29K 2081/06 (2013.01); B29K 2101/12 (2013.01); B29K 2105/089 (2013.01); B29K 2105/0881 (2013.01); B29K 2105/10 (2013.01); B29K 2307/04 (2013.01); *B29L 2031/06* (2013.01); *B29L 2031/3076* (2013.01); *F16C 2326/43* (2013.01); *Y02T 50/433* (2013.01)

(58) Field of Classification Search
CPC ... B29C 70/521; B29C 57/00; B29K 2101/12; B29K 2023/00; B29K 2071/00; B29K 2077/00; B29K 2081/04; B29K 2081/06; B29K 2105/0881; B29K 2105/089; B29K 2105/10; B29K 2307/04; B29L 2031/3076; B29L 2031/06; F16C 7/026; F16C 2326/43; B64C 1/18; Y02T 50/433
See application file for complete search history.

(56) References Cited

FOREIGN PATENT DOCUMENTS

| | | |
|---|---|---|
| DE | 10 2007 015 909 A1 | 10/2008 |
| EP | 0 626 250 A1 | 11/1994 |
| EP | 0 678 681 A1 | 10/1995 |
| EP | 2 267 327 A2 | 12/2010 |
| GB | 2 289 928 A | 12/1995 |

OTHER PUBLICATIONS

International Preliminary Report on Patentability dated Dec. 8, 2015, issued in corresponding International Application No. PCT/IB2014/061917, filed Jun. 3, 2014, 1 page.

International Search Report dated Jul. 18, 2014, issued in corresponding International Application No. PCT/IB2014/061917, filed Jun. 3, 2014, 3 pages.

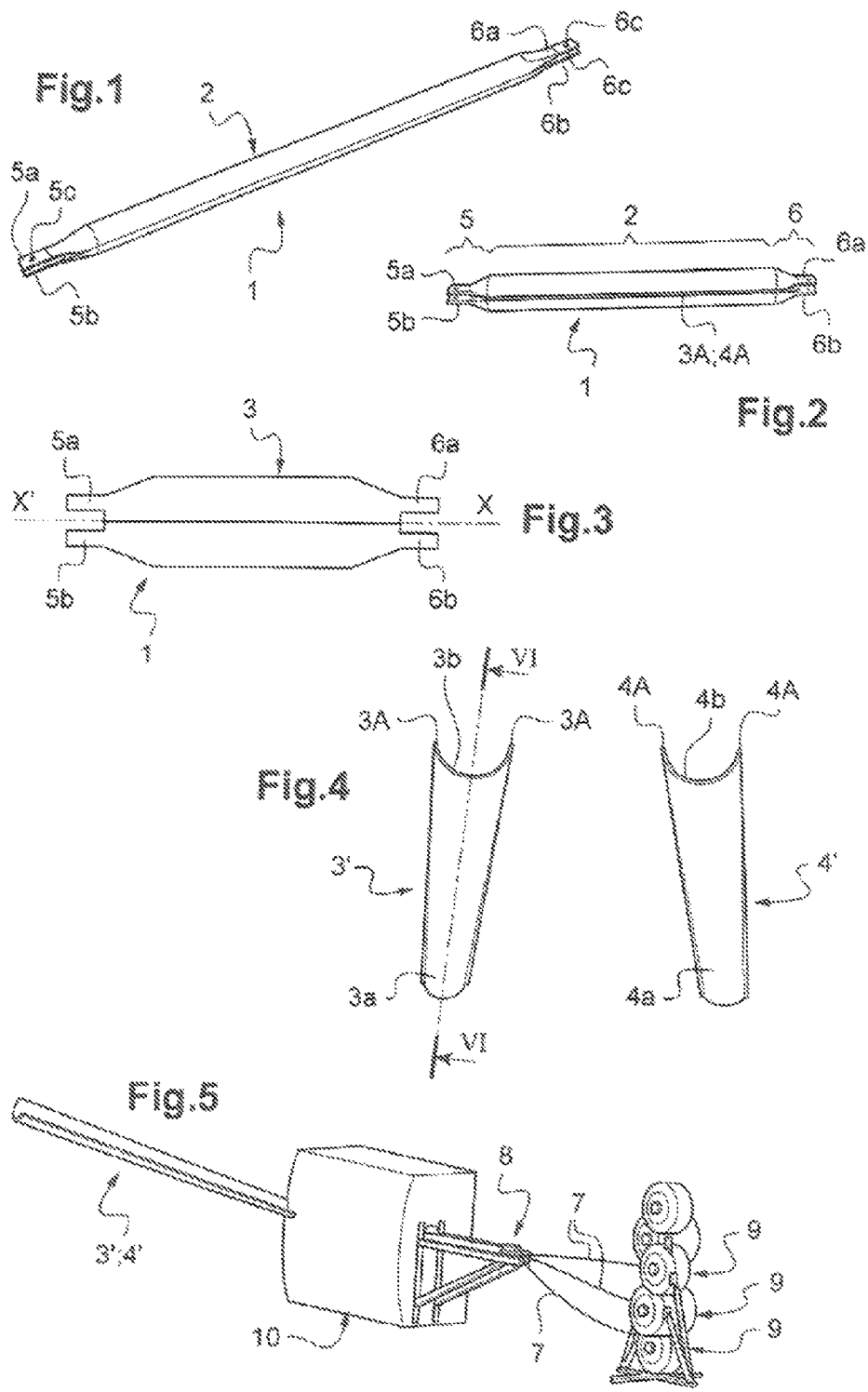

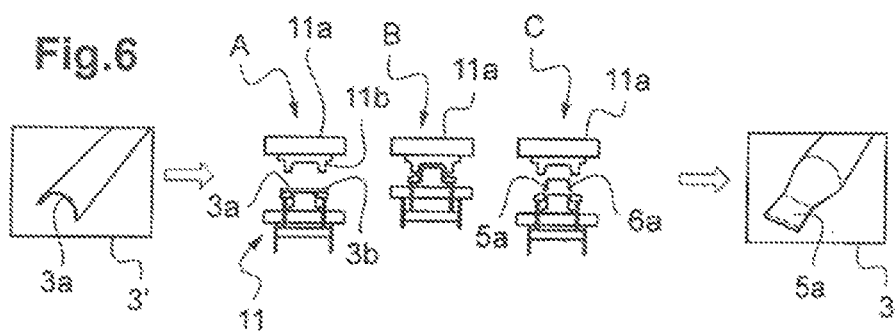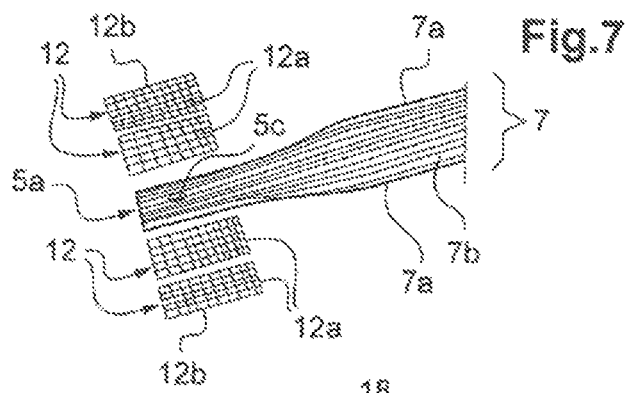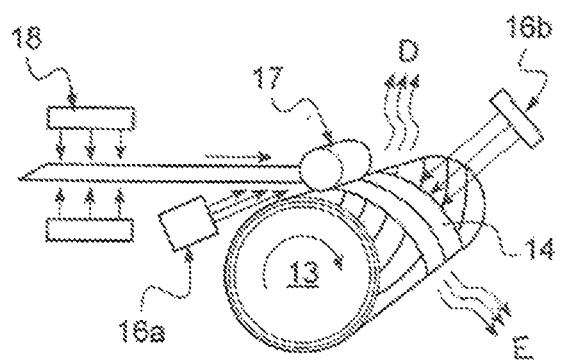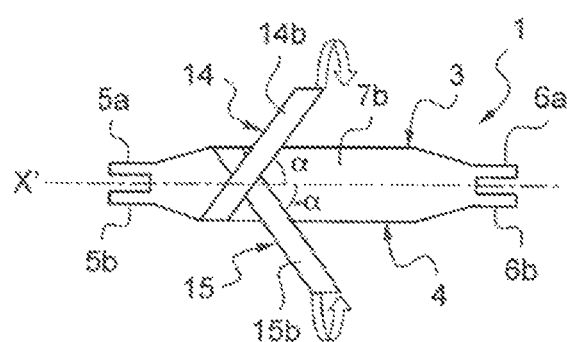

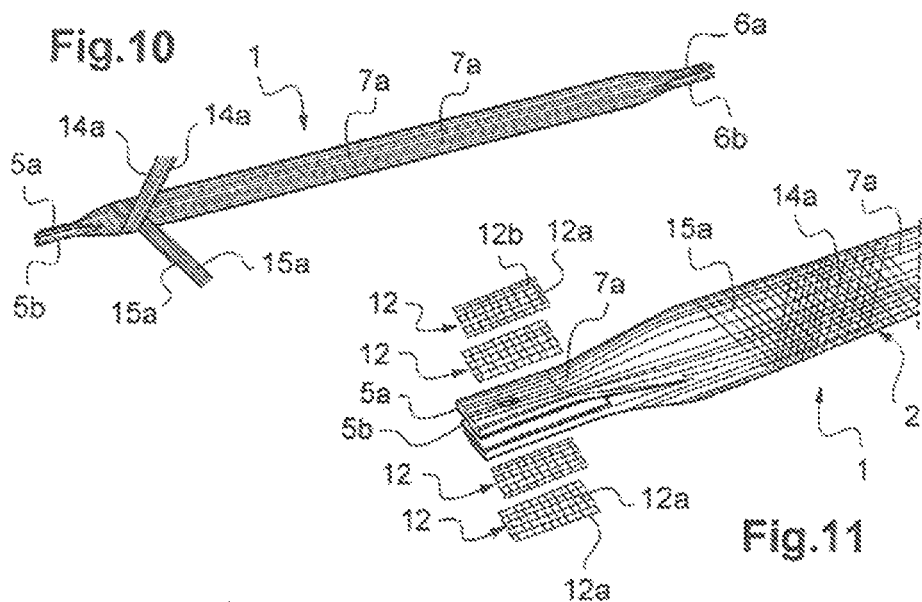
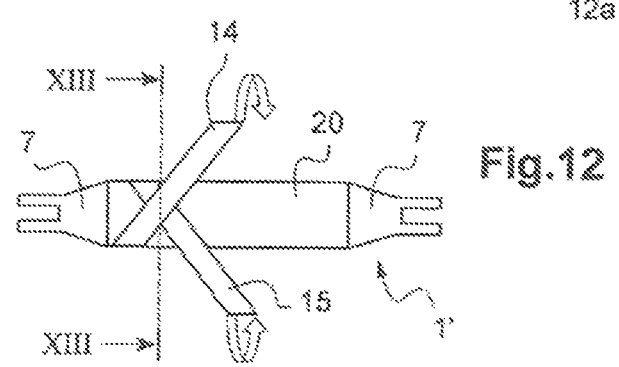
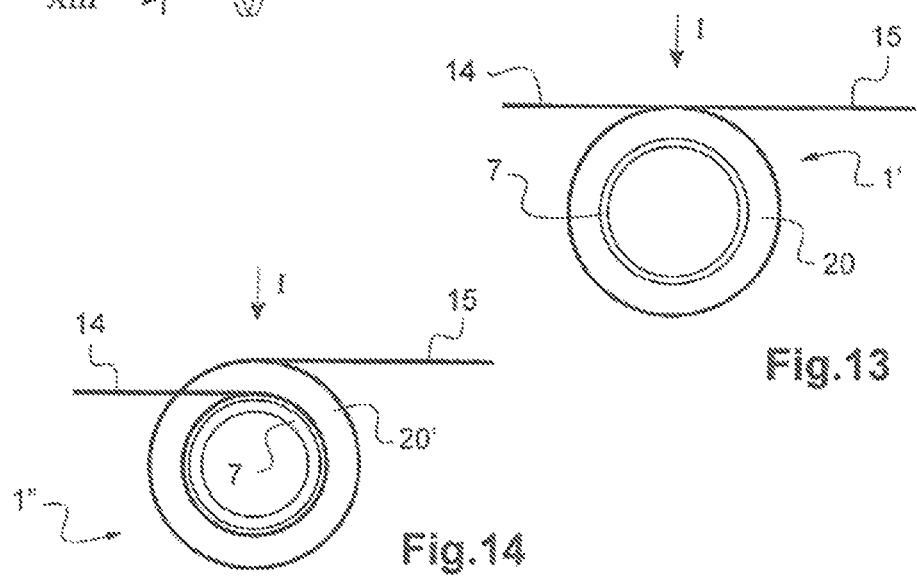

COMPOSITE CONNECTING ROD, METHOD FOR MANUFACTURING SUCH A ROD AND AERONAUTIC CEILING OR FLOOR STRUCTURE INCORPORATING SAME

FIELD OF THE DISCLOSURE

The present disclosure relates to a composite connecting rod, an aeronautic ceiling or floor structure incorporating it, and a method for manufacturing this connecting rod. The connecting rod is suitable for reacting primarily axial forces, in particular but not exclusively in the aeronautics field.

BACKGROUND

The current structural composite connecting rods for reacting axial forces typically have an elongated shape with a central primary body ending with two flat ends for connecting to structures in particular creating axial traction-compression forces, the connection typically being done by connecting axes respectively mounted through these ends.

Document WO-A1-2009/000925 describes such a connecting rod, which is obtained via a method comprising discontinuous thermoforming of flat composite preforms based on fibers impregnated with a thermosetting or thermoplastic resin to obtain two semi-cylindrical shells, then an assembly of these thermoformed shells by lateral securing of the respective pairs of longitudinal edges preferably via curing or thermowelding of the resin. This assembly of the shells is such that each edge of a shell covers or is laterally covered by an edge of the other shell, thus forming mutual support surfaces for these shells with relatively large surface areas.

The connecting rods described in this document have the drawback of having a relatively high mass and manufacturing cost, due to their discontinuous manufacturing method and the assembly mode of the shells by lateral overlapping of their edges, which requires doubling the thickness of the connecting rod.

More generally, one major drawback of the structural composite connecting rods known at this time lies in their high mass and cost, which are related on the one hand to the conversion method used, typically resin transfer molding (RTM) or molding of preimpregnated fibers of a resin that is also thermosetting, by compression in a mold using a bladder or mandrels, and on the other hand, reinforcing these connecting rods to give them sufficient impact strength. The quantity of reinforcements necessary to guarantee impact strength can be relatively high. Indeed, thermosetting resins for example of the epoxy type are extremely fragile due to their very weak elongation at break (typically several %). It is therefore necessary to add a number of plies inversely proportional to this elongation at break to make these resins better able to withstand deformation during impact, which contributes to making these connecting rods made from thermosetting materials heavier.

SUMMARY

One aim of the present disclosure is to propose a composite structural connecting rod resolving the aforementioned drawbacks, which comprises an elongated body that is essentially convex around the longitudinal axis of symmetry and two connecting ends for connecting to adjacent structures, and which is suitable for reacting primarily axial forces (i.e., traction-compression forces) generated by these structures, the connecting rod including two shells with two longitudinal edges that are assembled to one another in these edges at the body and that each are based on at least one shell web including continuous shell fibers primarily parallel to this axis of symmetry and impregnated with a thermoplastic shell matrix.

To that end, the connecting rod is such that it incorporates means for assembling shells comprising at least one assembly web wound around and along shells at the body, the assembly web(s) comprising assembly fibers primarily inclined by an angle $\pm\alpha$ relative to the axis of symmetry (i.e., relative to the predominantly axial shell fibers) and impregnated with a thermoplastic assembly matrix remelted in contact with the shell matrix.

It will be noted that these assembly means are extrinsic to the shells, since they are attached around the latter while gripping them via the assembly web(s) with which the matrix is remelted in contact with the matrix of each shell like thermowelding between the assembly web(s) and the webs of the shells. The advantage of this welding by "remelting" is saved time, energy, and therefore significant cost relative to thermosetting resins requiring many minutes or hours of curing.

It will also be noted that the two shells are thus assembled by this thermowelding of the assembly web(s) on and around the shells, unlike the assembly of the aforementioned document, which used mutual lateral welding of pairs of respective edges of the shells.

It will further be noted that these nonzero angles $\pm\alpha$ between the inclined assembly fibers and the axial shell fibers can be comprised between $\pm 30°$ and $\pm 90°$, for example.

According to another feature of the disclosure, each shell has a substantially semi-cylindrical or semi-frustoconical convex outer face at the body and has its two longitudinal edges assembled against those of the other shell in the extension of the latter, without mutual lateral overlapping of one edge of a shell by an edge of the other shell.

"Semi-cylindrical" means, in a known manner, a half-cylinder geometry, which is defined by a constant base line or section in the form of a curved line broadly speaking (e.g., oval or elliptical, for example circular).

"Semi-frustoconical" refers to a geometry consisting of a half cone trunk defined by a section also in the form of a curved line (e.g., oval or elliptical, for example circular), but which varies continuously increasing or decreasing over the axial length of each shell, narrowing toward the two connecting ends.

In some embodiments, the assembly means of the shells can comprise at least one pair of the assembly webs that are primarily unidirectional and are wound substantially in a spiral by opposite angles $\alpha$ and $-\alpha$ (for example comprised in absolute value between 30° and 90°), these assembly webs mutually overlapping one another and tightly surrounding the webs of shells that are also primarily unidirectional.

According to a feature of the disclosure, each of the connecting ends of the connecting rod has two flat parallel connecting walls that are respectively formed in a single piece with the two shells on either side of the median longitudinal plane of the connecting rod containing the longitudinal edges and which are respectively provided with facing orifices designed to be crossed through by a connecting pin for connecting to the corresponding structure, reinforcing plies comprising end fibers oriented least partially substantially perpendicular to the axis of symmetry directly covering the shell fibers of these two walls at each connecting end.

In some embodiments, the reinforcing plies, which are of the fabric, embroidery or unidirectional type, cover, at each connecting end, the respective outer faces and/or the respective inner faces of the two connecting walls.

According to another feature of the disclosure, the shell webs and the at least one assembly web can be made from identical or chemically compatible materials, the thermoplastic assembly matrix being melted in contact with the thermoplastic shell matrix.

In some embodiments, the thermoplastic shell matrix and the thermoplastic assembly matrix are based on at least one polymer chosen from the group made up of polyolefins, polyamide (PA), polyetherimides (PEI), polyarylimides (PAI), polyphenylene sulfide (PPS), polyaryletherketones (PAEK), polyether sulfones (PDF), polyetheretherketones (PEEK), polyetherketoneketones (PEKK) and alloys thereof, the shell fibers and/or assembly fibers preferably based on carbon fibers. It will be noted that other polymers and fibers can be used, provided that they give the connecting rod an impact resistance and sufficient ability to react axial forces.

It will be noted that a connecting rod thus formed has, in particular owing to these thermoplastic materials having intrinsic properties of self-extinguishing, low density, smoke toxicity, an improved impact resistance, significantly increased lightening for a same given value of these properties (e.g., impact resistance) relative to the known composite structural connecting rods.

This connecting rod thus in particular has improved mechanical properties regarding the reaction of axial forces and impact resistance, which appears to result in mass savings on the connecting rod to obtain determined properties.

It will be noted that in a known manner, the structural connecting rods in particular for ceiling, floor or central fuselage body structures in aeronautics must be able to withstand predefined limit loads while having previously undergone impacts damaging them that are representative of prior impacts, but not easily detectable, during operation. These limit loads are a combination of axial loads causing the connecting rod to work in traction/compression and radial loads causing it to work in flexion or buckling when it is added to the compression. Thus, damage to a connecting rod from a prior impact decreases its ability to withstand these loads. Depending on the fragility of the thermosetting resin used for a connecting rod of the prior art, it is therefore necessary to add a certain number of additional plies to it to satisfy the impact resistance.

The connecting rod as described above makes it possible to use, for the shells, on the one hand, webs of primarily or exclusively unidirectional fibers that are optimal to withstand these compression and buckling limit loads, and on the other hand, one or more thermoplastic matrices having an elongation at break much higher than that of the thermosetting matrices, which makes it possible to decrease the number of peripheral plies to obtain the required impact resistance.

According to another aspect, the connecting rod body can further include, radially between the at least one shell web for each shell and the at least one assembly web or radially between the assembly webs, at least one intermediate damping and impact distributing layer, in particular for radial impacts, that is made from a material able to absorb and distribute the energy transmitted to the connecting rod by these impacts.

It will be noted that this interposition of such a "sacrificial" intermediate layer, preferably made from a very light damping material (for example, a honeycomb damping material, or made from other damping materials), advantageously makes it possible to absorb and distribute—to decrease the impact thereof—in particular radial impacts in order to minimize the vulnerability of the shell webs that are primarily unidirectional positioned by design at the heart of the connecting rod to give it the required resistance to the aforementioned limit loads. The thickness of this "sacrificial" layer can be chosen easily based on the level of energy to be absorbed. This intermediate layer thus makes it possible to at least partially, in case of impact, preserve the integrity of the primarily unidirectional shell fibers that ensure the strength of the connecting rod.

In some embodiments, the at least one intermediate layer can further be an impact revealing layer able to attest to a degree of damage of the connecting rod following these impacts so that it may be replaced, like an impact indicator, by measuring the depth and/or the width of this layer affected by these impacts (i.e., by previously calibrating the depth and/or width of the impact depending on the impacts absorbed, to determine whether it is necessary to change the connecting rod).

Indeed, it is known that composite parts have the drawback of being able to sustain serious interior damage (e.g., by stripping, broken fibers or cracks) without this being visible from the outside, which requires their designers to oversize them so that they can withstand all of the fatigue loads and extreme loads, taking into account possible prior damage (these oversized parts are called "damage-tolerant").

Thus, the integration of a damage indicator into the connecting rod makes it possible not only to make the impact visible, but also to visually assess its severity. Indeed, the pushing-in depth in case of impact of the intermediate layer makes it possible to evaluate the gravity of this impact and therefore the need for a replacement, but for lower impact levels than those that would be necessary to create visible damage on a connecting rod not equipped with such indicator. This intermediate "control" layer advantageously allows additional lightening of the connecting rod, while avoiding oversizing it as in the prior art to make it "tolerant to nonvisible damage".

An aeronautic ceiling or floor structure includes at least one connecting rod as defined above.

A manufacturing method for a connecting rod as defined above comprises:

a) continuously configuring n primarily unidirectional flat shell webs (n integer≥2) based on continuous fibers impregnated with the thermoplastic shell matrix, from n coils unwinding these webs toward a conformer, b) continuous hot shaping of these shell webs by drawing including their consolidation, to obtain profiled blanks of shells with convex outer faces, c) heating followed by shaping of the two ends of each profiled shell blank, to obtain each shell having, at both of its ends, two respective flat walls for connecting to the structures, d) for each connecting rod to be assembled, an assembly of the two shells with the longitudinal edges of one shell positioned against those of the other shell so as to form the connecting rod body and with, at each end of the connecting rod, the two flat connecting walls that are parallel and spaced apart from one another, this assembly being implemented:

by winding the at least one assembly web around and along the shells at the body by inclining the assembly fibers by an angle $\pm\alpha$ relative to the axis of symmetry, and by concomitant local heating of the assembly web(s) wound on the shell webs, or of the sole shell webs, or else of the shell webs and at the same time of the at least one assembly web (irrespective of the heating means), and e) optionally an interposition, radially between the shell webs and the at least one assembly web or radially between the assembly webs, of at least one intermediate damping and impact distributing layer, in particular for radial impacts, that is made from a material able to absorb and distribute the energy transmitted to the connecting rod by these impacts and is preferably able to attest to the degree of damage to the connecting rod following these impacts so that it may be replaced, by a measurement of the depth and/or width of this layer.

In some embodiments, in step c), the forming of the two ends of each profiled shell blank can be done by compression molding, stamping or thermoforming.

Also in some embodiments, step c) can further comprise the application, on the flat walls of the respective ends of each shell blank, reinforcing plies preferably of the fabric, embroidery or unidirectional type comprising end fibers oriented at least partially substantially perpendicular to the axis of symmetry, these fibers thus oriented being able to directly cover the shell fibers on and/or under the two connecting walls spaced apart at each connecting end of the connecting rod obtained in step d).

Also in some embodiments, step c) can further comprise, at each end of each profiled blank, a piercing of orifices through the two connecting walls for the assembly of a connecting pin respectively designed for fastening of the structure.

According to another feature, in step d), the winding of the at least one assembly web around and along the shells of each connecting rod can be implemented by rotational driving of the two shells positioned across from one another around a mandrel.

It will alternatively be noted that the two shells positioned edge to edge could be stationary, and that in this case, one could use rotatable means to wind the at least one assembly web around the shells.

In some embodiments, identical or chemically compatible materials are used for the respective thermoplastic matrices of the shell webs in step a) and the or each assembly web in step d), the assembly being done in this step d) by remelting the assembly matrix on the shell matrix like thermowelding.

In some embodiments, for the shell matrix in step a) and the assembly matrix in step d), materials are used with a base of at least one polymer chosen from the aforementioned group, and carbon fibers for the shell fibers and/or assembly fibers.

DESCRIPTION OF THE DRAWINGS

Other features, advantages and details of the present disclosure will emerge from reading the following description of one example embodiment, provided as an illustration and non-limitingly, the description being done in reference to the attached drawings, in which:

FIG. 1 is a side perspective view of a connecting rod in the assembled state;

FIG. 2 is a side perspective view of another connecting rod in the assembled state, showing the contact interface between the two shells of the connecting rod;

FIG. 3 is a diagrammatic axial sectional view of this connecting rod, perpendicular to its end walls;

FIG. 4 is a diagrammatic view of two profiled shells used to manufacture the connecting rod of FIG. 1 or 2

FIG. 5 is a diagrammatic view of an installation for continuously manufacturing these profiled shells;

FIG. 6 is a schematic diagram showing, according to one example, the steps used to form, in the form of flat walls, two connecting ends of each shell before positioning and assembly of two shells;

FIG. 7 is a partial exploded diagrammatic view showing the application of plies oriented over the two faces of the flat wall of a connecting end thus formed for each of the two shells made up of unidirectional webs of axial fibers, after positioning and before assembly of these two shells;

FIG. 8 is a diagrammatic view of an installation according to one example for the assembly of shells positioned edge to edge, by winding of crossed webs around and along the shells;

FIG. 9 is a diagrammatic view in axial section similar to FIG. 3 illustrating the winding mode by opposite angles of two crossed webs around and along the shells thus positioned, and showing the respective thermoplastic matrices of these webs as well as the webs of shells;

FIG. 10 is also a diagrammatic, but lateral perspective view showing the beginning of this winding of the crossed webs on the shells of FIG. 9 and illustrating the orientation of the respective fibers of the shell webs and assembly webs;

FIG. 11 is a partial exploded diagrammatic view showing, like FIG. 7, these crossed webs, the assembly fibers of which overlap the axial fibers of the shells, with the plies oriented applied on the two flat walls of a connecting end of the connecting rod;

FIG. 12 is a diagrammatic axial sectional view similar to FIG. 9, showing a connecting rod during assembly that incorporates a damping layer positioned between the webs of shells and the two crossed assembly webs;

FIG. 13 is a diagrammatic cross-sectional view of this connecting rod during assembly along plane XIII-XIII of FIG. 12; and FIG. 14 is a diagrammatic cross-sectional view of another connecting rod in an alternative to FIG. 13, which incorporates a damping layer between only the two crossed assembly layers.

DETAILED DESCRIPTION

As illustrated in particular in FIGS. 1 to 3, a connecting rod 1 includes a convex body 2 with two shells 3 and 4 assembled against one another, and two connecting ends 5 and 6 designed to connect the connecting rod 1 to adjacent structures via two connecting pins (not visible) to be mounted respectively in these ends 5 and 6. Each connecting end 5, 6 forms a yoke with two parallel flat walls 5*a* and 5*b*, 6*a* and 6*b* that are spaced apart on either side of the axis of symmetry X'X of the connecting rod 1 and that are pierced with two facing orifices 5*c*, 6*c* designed to receive one of the connecting axes.

FIG. 4 shows the two profiled blanks 3' and 4' of the shells 3 and 4 used to manufacture this connecting rod 1, before shaping of the two ends 3*a* and 3*b*, 4*a* and 4*b* of each shell 3, 4 to obtain the two flat end walls 5*a* and 5*b*, 6*a* and 6*b* visible in FIGS. 1 to 3. These two blanks 3' and 4' each have a same semi-cylindrical geometry, which is obtained from a continuous shaping/forming method of primarily unidirectional webs 7, as illustrated in FIG. 5.

This FIG. 5 shows the passage to that end in a conformer 8 of n=3 unidirectional flat shell webs 7 with a base of continuous fibers 7*a* in the longitudinal direction (e.g., carbon fibers) and impregnated with a thermoplastic shell matrix 7*b* (e.g., PEEK or PPS) from three coils 9 receiving and unwinding these webs 7, then the continuous hot shaping of these webs 7 using a drying device 10, to obtain blanks of semi-cylindrical shells 3' and 4' in which these webs 7 have been consolidated concomitantly (the structure of the webs 7 is visible in FIG. 7). This shaping is for example done at a temperature of approximately 300° C. for the fusion of this matrix 7*b* and to keep the fibers 7*a* in the correct position.

FIG. 6 shows an example for forming, via compression molding, the two ends 3*a* and 3*b*, 4*a* and 4*b* of each blank 3' and 4' obtained downstream from the device 10 (having specified that stamping or thermoforming could also be used for this forming of the ends 3*a* and 3*b*, 4*a* and 4*b*). In order to allow the shaping, preheating is done beforehand of these two ends 3*a* and 3*b*, 4*a* and 4*b* of the blank 3', 4' then, as shown in A (in planar axial section along the apical plane VI-VI of FIG. 4), the profiled blank 3', 4' is inserted in a mold 11. The upper wall 11*a* of the mold 11 is then closed (step B) provided on its inner face with a key form 11*b* able to form these ends 3*a* and 3*b*, 4*a* and 4*b* by applying a determined pressure on them which, after opening of the upper wall 11*a* and removal of the blank 3', 4' (step C), makes it possible to obtain a flat wall 5*a* and 6*a*, 5*b* and 6*b* at each of its two ends 3*a* and 3*b*, 4*a* and 4*b*.

Each blank 3', 4' of the shell 3, 4 thus obtained with flat end walls 5*a* and 5*b*, 6*a* and 6*b* is formed from axial unidirectional shell webs 7, which extend continuously over the body 2 and over these end walls 5*a* and 5*b*, 6*a* and 6*b*.

As illustrated in FIG. 7, this shaping operation for the ends 3*a* and 3*b*, 4*a* and 4*b* of each blank 3', 4' further includes an application of reinforcing plies 12 oriented on the two outer and inner faces of each flat end wall 5*a* and 5*b*, 6*a* and 6*b*, and optionally furthermore inserts (not shown) for the piercing at 5*c*, 6*c* of each wall 5*a* and 5*b*, 6*a* and 6*b* in order to mount a connecting pin therein providing the connection of the connecting rod 1 to the two adjacent structures. These plies 12 can each be made up of a fabric or unidirectional fibers comprising, in both of these cases, once applied on and under each end wall 5*a* and 5*b*, 6*a* and 6*b*, oriented fibers 12*a* forming an angle of approximately 90° with the axial unidirectional fibers 7*a* of each wall 5*a* and 5*b*, 6*a* and 6*b* that these oriented fibers 12*a* cover (having specified that in the example of FIG. 7, the plies 12 comprise axial fibers 12*b*, in addition to fibers 12*a* oriented at 90°).

It will be noted that the addition of plies 12 and optionally inserts on the end walls 5*a* and 5*b*, 6*a* and 6*b* of the shells 3 and 4 must advantageously be done while retaining all of the axial fibers 7*a* making up the body 2 of each shell 3, 4.

Lastly and as illustrated in FIGS. 8 to 10, the two shells 3 and 4 are first positioned so that the two longitudinal edges 3A of one are precisely applied against those 4A of the other in the direct extension of these edges 3A and 4A. Then the shells 3 and 4 thus positioned on a mandrel 13 are tightened via a "taping" by crossed assembly webs 14 and 15, for example two, which are each made up of unidirectional fibers 14*a* and 15*a* (e.g., of carbon, like the shell fibers 7*a*) impregnated with an identical thermoplastic matrix 14*b* and 15*b*, derived from or compatible with that 7*b* of the shells (e.g., with a base of PEEK or PPS, like the shell matrices 7*b*).

To that end, the assembly webs 14 and 15 with fibers 14*a* and 15*a* primarily inclined by angles α and −α relative to the axis X-X, are wound in a spiral around and along the respective bodies 2 of the shells 3 and 4 (i.e., not at the end walls 5*a* and 5*b*, 6*a* and 6*b* of the shells 3 and 4, see FIGS. 9 and 10), while locally at the same time heating the assembly webs 14 and 15 being wound on the shell webs 7 using heating means 16*a* and 16*b* appropriate to ensure the melting of the thermoplastic matrices 7*b*, 14*b*, 15*b* and the cohesion of the whole (see FIG. 8). Conversely, one can also choose rather to heat the shell webs 7 during the winding of the assembly webs 14 and 15, the essential point being to thermo-reactivate, at the fusion limit, at least one of the sides in the zone of entry into contact with the webs.

As shown in FIGS. 12 and 13, it is possible to interpose an intermediate layer 20 for damping radial impacts (see arrow I) and advantageously able to attest to the degree of damage of the connecting rod 1' following these impacts, radially outside the shell webs 7 and radially inside the two assembly webs 14 and 15.

Or, as shown in FIG. 14, it is alternatively possible to choose to interpose such an intermediate radial impact damping layer 20' (see also arrow I) and advantageously able to attest to the degree of damage of the connecting rod 1" following these impacts, radially between the two assembly webs 14 and 15.

This winding of the assembly webs 14 and 15 is advantageously done by rotating the mandrel 13 covered with the two shells 3 and 4 around its axis of revolution (combined with the axis of symmetry X-X' of the shells 3 and 4), by rotational driving means (not shown) secured to the two ends of this mandrel 13, at the same time as the webs 14 and 15 are applied, under tension by these angles α and −α (for example comprised in absolute value between 30° and 90°) on the webs 7 of the shells 3 and 4 by means 17 for applying strips under tension or pressure, for example of the roller type.

These local heating means 16*a* and 16*b* can for example consist of hot air blowing means, a hot-air gun, means emitting in the infrared domain or laser radiation, and can be arranged downstream from the preheating means 18 for the assembly webs 14 and 15. It will be noted that these means 16*a*, 16*b*, 18 are illustrated only as an example of FIG. 8, which further shows heat releases by convection (arrows D) and radiation (arrows E).

Lastly, at the end of this assembly, one obtains the connecting rod 1 shown in an exploded view in FIG. 11, with its body 2 with axial shell fibers 7*a* that are coated with crossed assembly fibers 14*a* and 15*a* and with its connecting ends 5 and 6 with shell fibers 7*a*, also axial, that are coated with oriented reinforcing plies 12.

As previously indicated, it will be noted that the connecting rods 1, optimized in terms of force biasing, result in mass savings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A composite structural connecting rod that comprises an elongated body that is generally convex around a longitudinal axis of symmetry and two connecting ends for connecting to adjacent structures, and which is suitable for reacting primarily axial forces generated by these structures, the connecting rod including two shells with two longitudinal edges that are assembled to one another in these edges at said body and that each are based on at least one shell web including continuous shell fibers primarily parallel to this axis of symmetry and impregnated with a thermoplastic shell matrix, wherein the connecting rod incorporates assembly means for the shells comprising at least one assembly web wound around and along the shells at said body, said assembly web(s) comprising assembly fibers primarily inclined by an angle ±α relative to said axis of symmetry and impregnated with a thermoplastic assembly matrix melted in contact with the shell matrix.

2. The connecting rod according to claim 1, wherein each shell has a substantially semi-cylindrical or semi-frustoconical convex outer face at said body and has its two longitudinal edges assembled against those of the other shell in the extension thereof, without mutual lateral overlapping of one edge of a shell by an edge of the other shell.

3. The connecting rod according to claim 1, wherein said assembly means of the shells comprise at least one pair of said assembly webs that are primarily unidirectional and are wound substantially in a spiral by opposite angles α and −α, these assembly webs mutually overlapping one another and tightly surrounding said webs of shells that are also primarily unidirectional.

4. The connecting rod according to claim 1, wherein said shell webs and said at least one assembly web are made from identical or chemically compatible materials, said thermoplastic assembly matrix being melted in contact with said thermoplastic shell matrix.

5. The connecting rod according to claim 1, wherein said thermoplastic shell matrix and said thermoplastic assembly matrix are based on at least one polymer chosen from the group made up of polyolefins, polyamide (PA), polyetherimides (PEI), polyarylimides (PAI), polyphenylene sulfide (PPS), polyaryletherketones (PAEK), polyether sulfones (PDF), polyetheretherketones (PEEK), polyetherketoneketones (PEKK) and alloys thereof, said shell fibers and/or assembly fibers preferably having a base of carbon fibers.

6. The connecting rod according to claim 1, wherein said body further includes, radially between said at least one shell web for each shell and said at least one assembly web or radially between said assembly webs, of at least one intermediate damping and impact distributing layer, in particular for radial impacts, that is made from a material able to absorb and distribute the energy from these impacts, said at least one intermediate layer further preferably being able to attest to the degree of damage to the connecting rod following these impacts so that it may be replaced, by a measurement of the depth and/or width of said at least one layer.

7. The connecting rod according to claim 1, wherein each of said connecting ends of the connecting rod has two flat parallel connecting walls that are respectively formed in a single piece with the two shells on either side of the median longitudinal plane of the connecting rod containing said longitudinal edges and which are respectively provided with facing orifices designed to be crossed through by a connecting pin for connecting to said corresponding structure, reinforcing plies comprising end fibers oriented least partially substantially perpendicular to said axis of symmetry directly covering said shell fibers of these two walls at each connecting end.

8. The connecting rod according to claim 7, wherein said reinforcing plies, which are of the fabric, embroidery or unidirectional type, cover, at each connecting end, the respective outer faces and/or the respective inner faces of said two connecting walls.

9. An aeronautic ceiling or floor structure, including at least one connecting rod according to claim 1.

10. A method for manufacturing a connecting rod according to claim 1, comprising:
   a) continuously configuring n primarily unidirectional flat shell webs (n integer≥2) based on continuous fibers impregnated with said thermoplastic shell matrix, from n coils unwinding these webs toward a conformer,
   b) continuous hot shaping of these shell webs by drawing including their consolidation, to obtain profiled blanks of shells with convex outer faces,
   c) heating followed by shaping of the two ends of each profiled shell blank, to obtain each shell having, at both of its ends, two respective flat walls for connecting to said structures,
   d) for each connecting rod to be assembled, an assembly of the two shells with the longitudinal edges of one shell positioned against those of the other shell so as to form said connecting rod body and with, at each end of the connecting rod, the two flat connecting walls that are parallel and spaced apart from one another, this assembly being implemented:
      by winding said at least one assembly web around and along the shells at said body by inclining said assembly fibers by an angle ±α relative to said axis of symmetry,
      by concomitant local heating of the assembly web(s) wound on the shell webs, or of the sole shell webs, or else of said shell webs and at the same time of said at least one assembly web, and
   e) optionally an interposition, radially between the shell webs and said at least one assembly web or radially between said assembly webs, of at least one intermediate damping and impact distributing layer, in particular for radial impacts, that is made from a material able to absorb and distribute the energy transmitted to the connecting rod by these impacts and is preferably able to attest to the degree of damage to the connecting rod following these impacts so that it may be replaced, by a measurement of the depth and/or width of this layer.

11. The method for manufacturing a connecting rod according to claim 10, wherein said shaping of the two ends of each profiled shell blank is done by compression molding, stamping or thermoforming.

12. The method for manufacturing a connecting rod according to claim 10, wherein step c) further comprises the application, on said flat walls of the respective ends of each shell blank, reinforcing plies preferably of the fabric, embroidery or unidirectional type comprising end fibers oriented at least partially substantially perpendicular to said axis of symmetry, these fibers thus oriented directly covering said shell fibers on and/or under said two connecting walls spaced apart at each connecting end of the connecting rod obtained in step d).

13. The manufacturing a connecting rod according to claim 10, wherein step c) further comprises, at each end of each profiled blank, a piercing of orifices through said two connecting walls for the assembly of a connecting pin respectively designed for fastening of one said structure.

14. The manufacturing a connecting rod according to claim 10, wherein in step d), the winding of said at least one assembly web around and along the shells of each connecting rod is implemented by rotational driving of the two shells positioned across from one another around a mandrel.

15. The manufacturing a connecting rod according to claim 10, wherein identical or chemically compatible materials are used for the respective thermoplastic matrices of said shell webs in step a) and said at least one assembly web in step d), the assembly being done in this step d) by remelting the assembly matrix on the shell matrix like thermowelding.

16. The method for manufacturing a connecting rod according to claim 10, wherein one uses:
- for said thermoplastic shell matrix in step a) and for said thermoplastic assembly matrix in step d), materials based on at least one polymer chosen from the group made up of polyolefins, polyamide (PA), polyetherimides (PEI), polyarylimides (PAI), polyphenylene sulfide (PPS), polyaryletherketones (PAEK), polyether sulfones (PDF), polyetheretherketones (PEEK), polyetherketoneketones (PEKK) and alloys thereof, and preferably
- carbon fibers for said shell fibers and/or assembly fibers.

* * * * *